G. W. EDWARDS.
Seed-Planter.

No. 216,163. Patented June 3, 1879.

Witnesses:
Henry Eichling
B. E. Clarke

Inventor
G. W. Edwards
by Dodge & Son
Attys.

UNITED STATES PATENT OFFICE.

GUSTAVUS W. EDWARDS, OF BRUNSWICK, MISSOURI, ASSIGNOR OF ONE-HALF HIS RIGHT TO CHARLES V. B. SLADE, OF SAME PLACE.

IMPROVEMENT IN SEED-PLANTERS.

Specification forming part of Letters Patent No. 216,163, dated June 3, 1879; application filed December 18, 1878.

*To all whom it may concern:*

Be it known that I, GUSTAVUS W. EDWARDS, of Brunswick, Chariton county, State of Missouri, am the inventor of an Improved Seed-Planter, of which the following is a full, clear, and exact description, reference being had to the accompanying drawings, forming part of this specification, in which—

Figure 1:
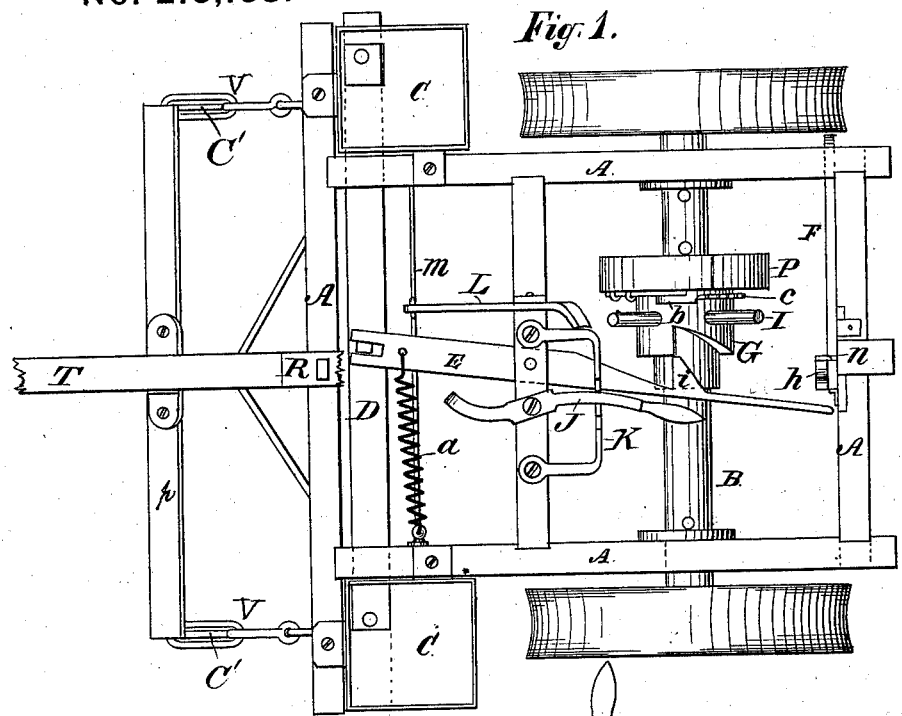
Figure 2:
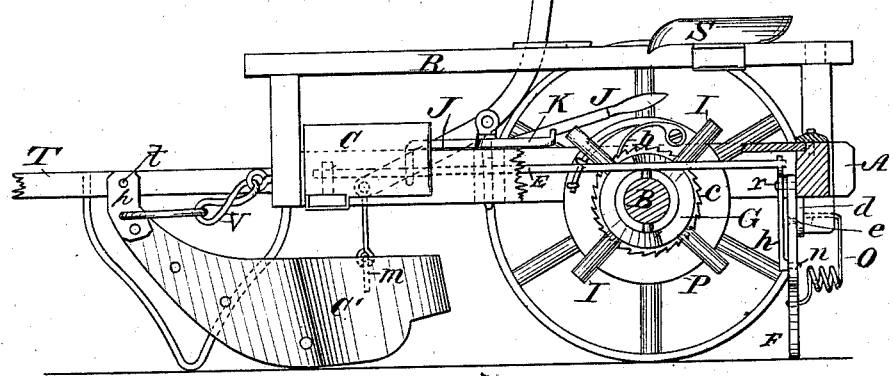
Figure 3:
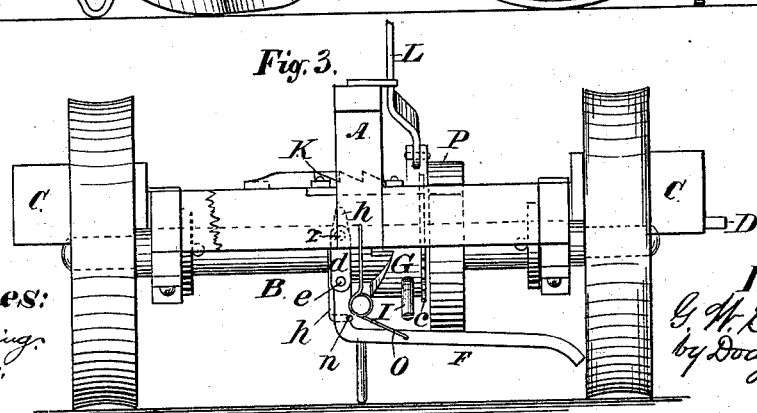

Figure 1 is a plan of a planter embodying my invention. Fig. 2 is a side elevation, shown partly in section; and Fig. 3 is a rear elevation of the same.

My invention relates to that class of seeding-machines known as "corn-planters;" and the invention consists in a combination of mechanism by which the seed-slide and the marker are both operated automatically, and can be thrown out of operation at will.

It further consists in arranging the operating mechanism in such a manner that it can be adjusted at any time to compensate for any loss or gain in the movement or travel of the machine, so as to insure the planting of the seed with accuracy in check-rows, all as hereinafter explained.

In the drawings, A represents the main frame, which is a simple rigid rectangular frame, with an elevated bar, R, on which is mounted a seat, S, arranged to be moved back and forth so as to adjust the weight of the driver, as may be required to balance the machine.

The runners or furrow-openers C' are secured rigidly at their front ends to a cross-bar, *p*, which is pivoted to the tongue by a bolt, *t*, in such a manner as to permit the rear ends of the runners to be raised or lowered at will, the ends of the bar *p* being connected to the main frame by chains V to keep it from swinging back and forth at its ends, and thus cause the runners to move in a right line. The runners C' are connected by a cross-bar, *m*, Figs. 1 and 2, and to this cross-bar a lever, L, is connected by a link or rod, as shown in Fig. 2, this lever L extending upward within reach of the driver, so that he can elevate the runners clear of the ground whenever desired.

The frame A is mounted on an axle, B, supported on two concave-rimmed wheels in the usual manner, one of said wheels being fast upon its axle, so as to turn the axle with it as the machine is drawn along. On this axle B is permanently secured a hub or disk, P, and close alongside of the same, but loose on the axle, is placed a cam-wheel, G, as shown in Fig. 1, the cam-wheel having secured to it a ratchet-wheel, *c*, in the notches of which engages a spring-pawl, *b*, as shown in Fig. 2, these parts being so arranged that as the machine moves forward the cam-wheel G is made to turn with the axle. It follows from this arrangement of parts that the cam-wheel can be turned forward on the axle at any time, and to any extent desired, and it is provided with a series of arms, I, for the purpose of so turning it. The object of this is to so adjust the cam-wheel as to make it operate the seed-slide sooner or later, according as the machine may have lost or gained ground in its forward movement, so as to insure the dropping of the seed at the proper time, in order to keep the row straight transversely as well as longitudinally, as is necessary when planted in check-rows, so that the corn can be readily cultivated both longitudinally and transversely of the field.

The seed-hoppers C are located over the heel of the runners C', as usual, and the seed is measured and dropped by means of slides working transversely in the bottom of the hoppers, as usual, these slides being connected by a cross-bar, D, as shown in Fig. 1. A lever, E, is pivoted upon the frame in such a manner that, while its front end is connected to the bar D, its rear portion passes alongside of the cam-wheel G, it being provided at that point with a projection, *i*, which bears against the face of the cam-wheel G, so that as each of the cams on the wheel passes this projection *i* it shoves it over sidewise, thereby operating the lever E, and through it the lever D and the seed-slides connected thereto, there being a spring, *a*, arranged to move the lever and slides in the opposite direction, as shown in Fig. 1.

In order to hold the lever E away from the cam-wheel G when it is desired not to have the seed-slides operate, as in going to and from the field or in turning at the ends of the rows, I use a lever, J, which, as shown in Fig. 1, is pivoted to the frame near one side of the lever E with its front end bent downward, so as to bear against said lever E, and thus throw it around to one side far enough to throw its projection i out of contact with the cam-wheel G, there being a notched bar, K, arranged under the rear arm of the lever J in such a position as to hold the parts out of operation whenever desired.

From this arrangement of parts it will be seen that as the machine moves forward the cam-wheel G will operate the seed-slides and deposit the seeds at regular intervals, and that whenever, owing to the inequalities of the surface, the machine has advanced so as to drop the seed too soon, or has fallen behind, so as to drop it too late, the cam-wheel G can be adjusted on the axle so as to compensate for such gain or loss in the movement of the machine, and thereby keep the cross-rows even and straight.

If it be desired to move the cam-wheel so as to drop the seed sooner, as is necessary in case the machine has gained ground, it can be readily done without stopping the team by the driver, who has simply to take hold of one of the handles I and turn the cam-wheel the required distance. In case it is desired to make it drop later, then the lever E will be disconnected from the cam-wheel, and the latter be turned forward past one of the cam-points and stopped at the required point, so as to make a longer period intervene before the slide is again operated.

By arranging the lever E so that it can be thrown out of contact with the cam-wheel, the wheel can be turned to any desired extent without operating the seed-slides, and thus it can be adjusted by moving the cam-points past the nose i of the lever E without dropping any seed, which cannot be done with those machines which have their operating-lever permanently in contact with the driving cam-wheel.

In order to enable the operator to see where the seed was deposited in the row previously planted it is necessary that a mark be made to indicate the spot; and for this purpose I attach to the rear end of the frame A a marker, which consists of a bent or elbow lever, F, as shown in Fig. 3. This lever is pivoted at e to a stud or arm, d, secured rigidly to the frame.

To the upper or vertical end of this lever F I pivot at r, Figs. 2 and 3, a latch, h, which has its lower end bent at a right angle, so as to form an arm, n, which engages against the front edge of the lever F at some distance below the pivot or pin e, on which the lever F vibrates, the upper end of this latch h extending up far enough to be struck by rear-extended arm of the lever E, as shown in Fig. 2, so that as the lever E moves toward the cam-wheel G its rear end will strike the upper end of said latch h, and cause it to force the end of the marker F down upon the ground, thus making a mark each time a hill is planted, this marker of course being adjusted at such distance from the seed-hopper as to strike the ground at the point where the seed is deposited as the machine moves forward.

As shown in Fig. 3, there is a spring, O, arranged to raise the marker the moment the lever E has ceased to operate upon it, or as soon as it has made its mark over the ground. These parts are so located and arranged that the lever E passes entirely past the upper end of the latch h at each stroke; but as the latch is pivoted loosely to the lever or marker F, and as its arm n engages against the marker only when moving in one direction, it follows that it turns freely on its pivot r when the lever E is moved backward, thus permitting the lever to pass freely over it without moving or in any manner operating on the marker during the backward movement of the lever E.

By this construction and arrangement of mechanism it will be seen that the cam-wheel G operates the seed-slides and the marker simultaneously, and that thus the planting and marking are both performed automatically by the movement of the machine.

I am aware that it is not new to operate the seed-slides by means of cams, and that a lever has been used to throw the seed-slides out of operation.

I am also aware that a patent has been granted in which the operating cam-plate is arranged to be disconnected from a driving-clutch, and then adjusted by means of a ratchet and pawl operated by a foot-lever; but I am not aware that the operating cam-wheel has ever been provided with handles and arranged like mine, nor that any machine has been made with the combination of operating devices like mine; and, therefore,

What I claim is—

1. The combination, in a corn-planter, of the bar D, having the seed-slides attached, the lever E, having a spring applied to operate it in one direction, and the cam-wheel G, mounted on the axle B, and connected thereto by a ratchet and pawl, and provided with the handles I, whereby said cam-wheel is made to operate the seed-slides, and is capable of being adjusted by the hand of the driver, as set forth.

2. The cam-wheel G, mounted loosely on the axle, and connected thereto by a ratchet and pawl, said wheel being provided with the series of handles I, whereby the operator is enabled to adjust or turn it to the desired point by a single movement of his hand and without stopping the team, if so desired.

3. The combination, in a corn-planter, of an adjustable cam-wheel, G, a lever, E, for transmitting motion from the cam-wheel to the seed-slides, and a lever and rack, or equivalent device, for holding the lever disconnected from the cam-wheel, whereby the cam-wheel can be turned to any extent without operating the seed-slides.

4. The marker F, having the pivoted latch $h$ and spring $o$ applied thereto, in combination with the lever E and cam-wheel G, all arranged to operate substantially as set forth.

GUSTAVUS W. EDWARDS.

Witnesses:
 J. H. KINLEY,
 W. T. GRAHAM.